United States Patent [19]

Stieger

[11] 4,350,862

[45] Sep. 21, 1982

[54] FEEDING DEVICE IN A WELDING MACHINE FOR FEEDING CAN BODIES TO ELECTRODE ROLLS

[75] Inventor: Othmar Stieger, Zurich, Switzerland

[73] Assignee: Paul Opprecht, Bergdietikon, Switzerland

[21] Appl. No.: 165,703

[22] Filed: Jul. 3, 1980

[30] Foreign Application Priority Data

Jul. 19, 1979 [CH] Switzerland .......................... 6731/79
May 5, 1980 [CH] Switzerland .......................... 3482/80

[51] Int. Cl.³ ............................................. B23K 11/06
[52] U.S. Cl. ........................................ 219/64; 219/79; 219/81; 228/47; 413/74
[58] Field of Search .............. 219/64, 79, 80, 81; 113/11 R, 115; 198/736, 747; 228/47

[56] References Cited

U.S. PATENT DOCUMENTS

| 2,187,740 | 1/1940 | Hothersall | 219/64 |
|---|---|---|---|
| 2,236,848 | 4/1941 | Graham et al. | 219/64 |
| 2,646,491 | 7/1953 | Coates et al. | 219/81 |
| 2,787,465 | 4/1957 | De La Motte | |
| 2,791,978 | 5/1957 | Nordquist et al. | 113/115 X |
| 3,001,637 | 9/1961 | Socke | 198/747 X |
| 4,144,440 | 3/1979 | Schalch et al. | 219/81 X |
| 4,145,986 | 3/1979 | Bauer | 219/64 X |

OTHER PUBLICATIONS

*Westinghouse Engineer,* Jul. 1957, pp. 126–128; "Motocylinders, A New Tool for Machine Designers", by P. A. Raibideau.

Primary Examiner—J. V. Truhe
Assistant Examiner—Keith E. George
Attorney, Agent, or Firm—Ernest F. Marmorek

[57] ABSTRACT

An apparatus for transporting successive pieces to be separated from one another at respective predetermined spacings at a predetermined velocity, includes a rotary-to-linear movement conversion device, including a crank normally arranged to be driven at a prearranged angular velocity by a drive mechanism, and a clutch normally connected to, but disconnectable from the crank, and adapted to be connected to a drive device for periodically reducing the angular velocity to zero, so that the spacing of successive pieces may be accurately adjusted.

3 Claims, 2 Drawing Figures ns,862

FEEDING DEVICE IN A WELDING MACHINE FOR FEEDING CAN BODIES TO ELECTRODE ROLLS

BACKGROUND OF THE INVENTION

In many industries, particularly in packing machines, a crank drive is a conventional drive element for transporting work pieces. In many cases the work piece is moved from a first stationary position to a second stationary position spaced from the first stationary position, where it can be further processed.

In other applications the work piece is transferred in a "flying" manner, that means the work piece is transferred to the processing station prior to the reversal of the crank.

Thus it is known to transfer the work piece from a first stationary position at a certain uniform transfer velocity to a processing station. If, however, for example as a result of the capacity of any machines postcoupled to the processing station, any change in the rhythm of the pieces successively transported to the processing station occurs, or, alternately, if the spacing between transported work pieces is to be changed, and where the velocity of any tool of the processing station remains unchanged for technological reasons, then the transfer rhythm cannot be changed by changing the velocity of the crank drive, without also changing the transfer velocity.

SUMMARY OF THE INVENTION

It is therefore one of the principal objects of the present invention to obviate the foresaid disadvantages, and to transfer work pieces, such as can bodies, at a freely selectable spacing, which may be in the range preferably from about 0.1 millimeter to infinity, when each piece is singly welded by means of a crank drive to the welding electrode rolls of a resistance welding machine, where the welding electrodes as well as the transport means are driven by a common continuously operating drive, such as a crank, and where the transfer rhythm can be freely chosen.

It is a further object of the present invention to adjust the spacing or the rhythm of the can bodies which are being transferred with as simple means as possible, without disconnecting the machine or parts thereof.

Specific advantages of the invention are:

Freely selectable spacing from a distance just greater than zero to a distance of infinity,
or
a predetermined and adjustable transfer velocity when the rhythm of the work pieces remain constant,
a simple, inexpensive and trouble free construction,
minimal required torque for driving the apparatus, as the crank is temporarily stopped at a dead center, and
individual advance of the work pieces.

Further objects and advantages of the invention will be set forth in part in the following specification, and in part will be obvious therefrom without being specifically referred to, the same being realized and attained as pointed out in the claims hereof.

BRIEF DESCRIPTION OF THE DRAWINGS

For a fuller understanding of the nature and objects of the invention, reference should be had to the following detailed description, taken in connection with the accompanying drawings, in which.

DESCRIPTION OF THE PREFERRED EMBODIMENTS

Figure 1:
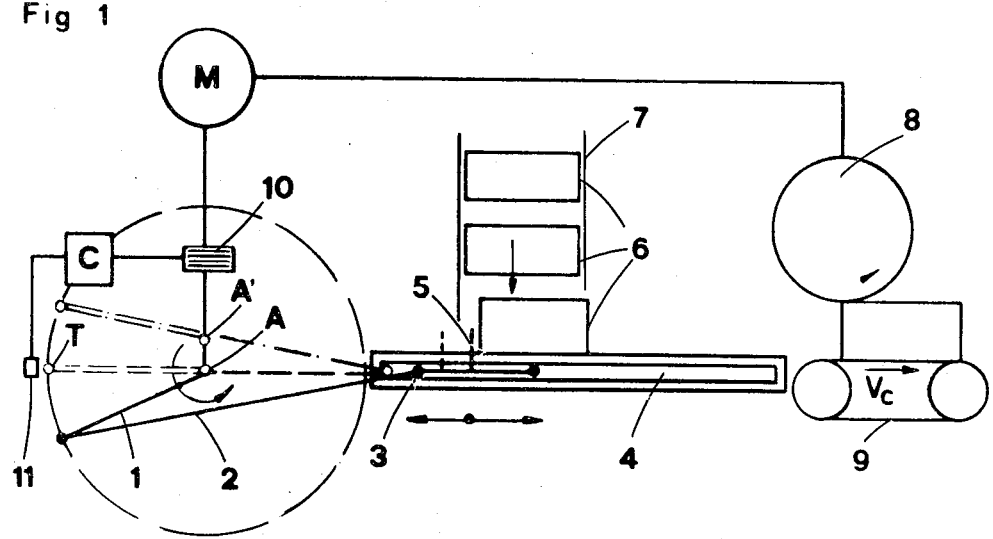
FIG. 1 is a diagrammatic elevational view of a transport mechanism and a processing station.
Figure 2:
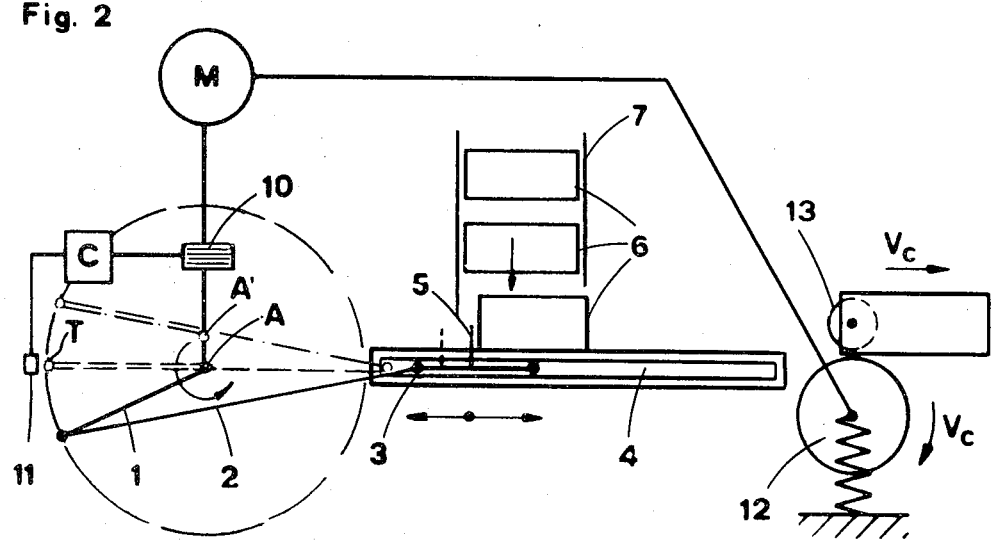
FIG. 2 is a diagrammatic elevational view of the transport mechanism and the electrode rolls of a resistance welding machine.

Referring now to the drawing, there will be seen in FIGS. 1 and 2 a rotary-to-linear movement conversion means, such as, for example a crank drive including a crank 1 rotatable about a point of rotation A. The crank 1 is normally driven at a prearranged angular velocity by drive means, such as a motor M. A connecting rod 2 is pivoted near an end of the crank 1, and an end 3 of the connecting rod 2 may be longitudinally displaced along a guiding groove 4. Entrainment means 5 connected to the end 3 of the pivoting rod 2, which guide the end 3 in the groove 4, is arranged to transfer work pieces, such as can 6 from a storage or supply means 7 to the right, and to transfer them in a "flying" manner at a prearranged and adjustable linear speed or velocity $v_C$ along a path of travel to the processing station, and its transport mechanism 9 as shown in FIG. 1, or to transfer them to the electrode rolls 12 and 13 of a resistance welding machine, as best seen in FIG. 2.

It will be understood that the crank 1 may also be rotated about a point A', so as to optimize the velocity during advance of the work pieces 6 between the storage means 7 and the processing station, consisting of a tool 8 and the electrode rolls 12 and 13, for example.

Both the crank 1 as well as the processing station, including the tool 8 and the electrode rolls 12 and 13, may be advantageously driven by a common motor M. Any changes in the velocity of the tool 8 and the electrode rolls 12 and 13 will therefore also occur in the velocity of the crank 1.

Between the motor M and the crank 1 there is provided a clutch 10, normally connected to, but which may be disconnected from, the crank 1, and which is adapted to be connected to the drive means, namely the motor M, for periodically reducing the angular velocity to zero, so that the spacing of successive pieces may be accurately adjusted. The clutch 10 may be an electromagnetic, mechanical, hydraulic or any other type of clutch, and is advantageously controlled by the control means C. The clutch 10 is preferably connected to a brake, which brakes the crank 1 after the clutch 10 has been released; the brake may be advantageously built into the clutch 10.

As can be seen from the FIGS., the rotary-to-linear conversion means, such as the crank 1, has an outer dead center, (facing away from the processing station 8, 12 and 13,) near which there is disposed an end switch 11. End switches 11 of the type described are, for example manufactured by Honeywell, for example the 932 A switch for DC, or the 933 A switch for AC.

The clutch 10 is manufactured, for example, by Ortlinghaus, and may include a built-in brake, as shown in the enclosed brochure.

The apparatus, according to the invention, operates as follows: When the clutch 10 is operative, the crank 1 rotates at a prearranged angular velocity and transports the work pieces 6 at a rate corresponding to a time interval $t = (60)/(N)$.

If the timing interval t is to be increased by a predetermined time $t_1$, or if the spacing between the work pieces is to be increased, without changing the transfer velocity or transport characteristics of the work pieces 6 to the processing station including elements 8, 12 and 13, then the angular velocity of the crank 1 is periodically reduced to zero, following a complete rotation of the crank, so that the crank comes to a temporary stop.

It is preferable to periodically reduce the angular velocity of the crank near the outer dead center T during a time interval $t_1$, so that the clutch 10 is opened or released during this time interval $t_1$, and the crank 1 simultaneously braked thereby. It is advantageous if the duration of the stop of the crank 1 is adjustable.

While the crank 1 has come to a stop and rests, the spacing between the individual cans is varied, or equivalently the number of the can bodies produced per unit of time is determined. Factors which influence this time are the length of the can bodies (long can bodies require longer stops than shorter can bodies, so that they cannot be slid into one another) but it is the efficiency of the machine following the processing station which determines duration of the stopping time.

Switch means, such as the switch 11, which activates a timing relay in the control means C, advantageously set the timing of the work process. The end switch 11, which scans the crank 1 optically or mechanically near its dead center, also generates a signal to the control means, such as a timing relay, to stop the crank 1 periodically, where the duration of the stop may be adjustable. This is done in practice by the end switch 11 transmitting a signal to the control means (for example a timing relay) to reduce the speed of the crank 1 with a view of stopping it for a time ranging between zero and x seconds. The time to be adjusted will depend from the above-named factors.

It is possible, of course, that other electronic elements instead of the end switch 11 are provided by means of which the clutch 10 may be actuated.

The clutch 10 may be an electromagnetic, mechanical, or other device operating on known principles.

I wish it to be understood that I do not desire to be limited to the exact details of construction shown and described, for obvious modifications will occur to a person skilled in the art.

Having thus described the invention, what I claim as new and desire to be secured by Letters Patent is as follows:

1. An apparatus for transporting at a predetermined final speed successive can bodies at selectable spacings along a path of travel, comprising in combination, entrainment means movable in opposite directions between a can body receiving station and a pair of continuously rotating electrode rolls and being operable to convey successive can bodies from said receiving station towards said electrode rolls and to deliver them to said electrode rolls at said final speed, rotary-to-linear movement conversion means, including a crank normally adapted to be driven at a prearranged angular velocity by drive means, a connecting rod pivoted to said crank and connected to said entrainment means, an enlongated guiding means operable for guiding said entrainment means during its movement, a clutch adapted to be driven by said drive means and normally connected to, but disconnectable from said crank, for cyclically reducing said angular velocity to zero upon being disconnected from said crank following a complete rotation of said crank, whereby said crank comes to a complete stop, and the spacing of successive can bodies may accurately be adjusted without changing said predetermined final speed at the electrode rolls.

2. An apparatus as claimed in claim 1, wherein said rotary-to-linear movement conversion means has an outer dead center, and wherein the angular velocity is cyclically reduced to zero near said outer dead center.

3. An apparatus as claimed in claim 2, wherein the duration of said stop is adjustable.

* * * * *